Aug. 11, 1970　　　　　　　B. T. COON　　　　　　3,523,784
MANUFACTURE OF AMMONIUM PHOSPHATE FERTILIZER
Filed Aug. 24, 1966
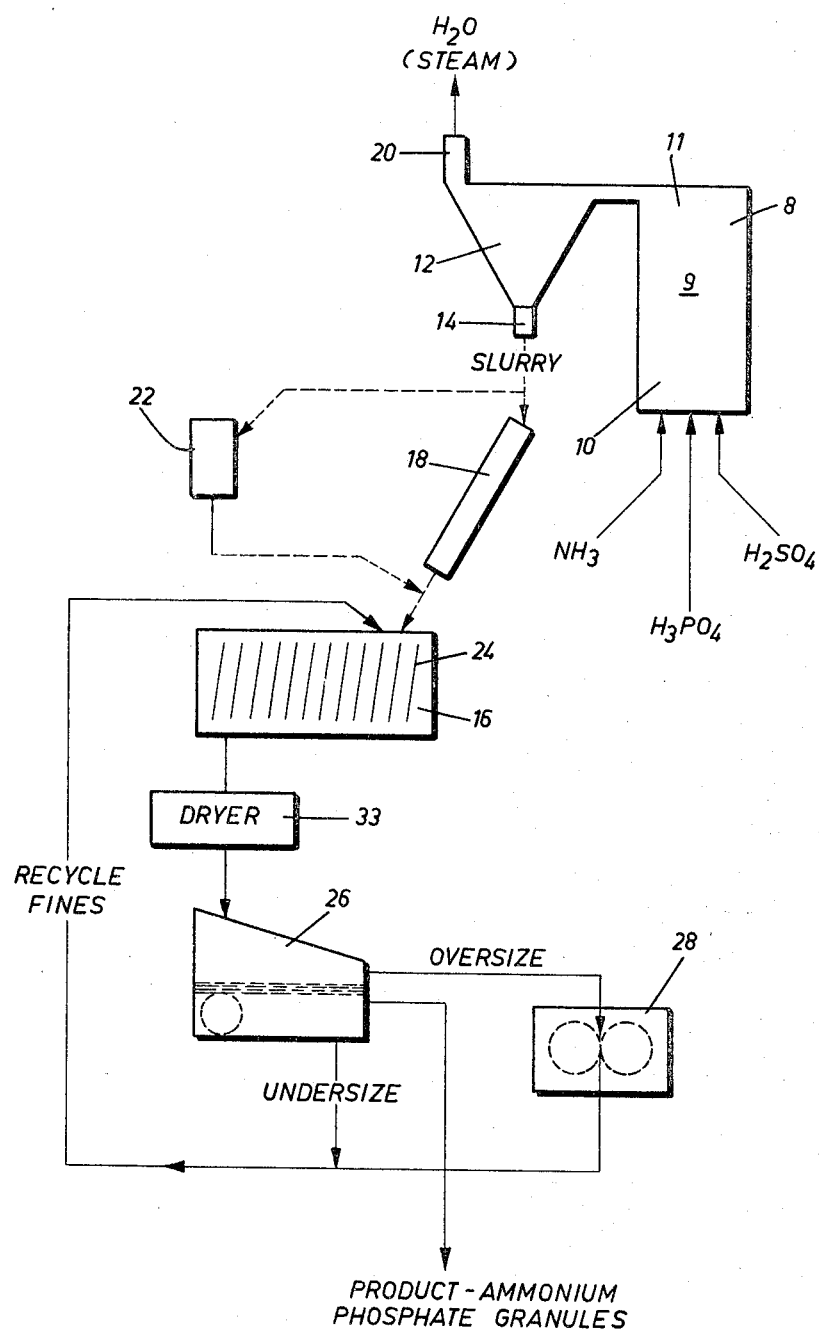
INVENTOR.
BENJAMIN T. COON
BY
Agent United States Patent Office 3,523,784
Patented Aug. 11, 1970

3,523,784
MANUFACTURE OF AMMONIUM
PHOSPHATE FERTILIZER
Benjamin T. Coon, Rossland, British Columbia, Canada, assignor to Cominco Ltd., Montreal, Quebec, Canada, a corporation of Canada
Filed Aug. 24, 1966, Ser. No. 574,679
Claims priority, application Canada, July 12, 1966, 965,197
Int. Cl. C05b 7/00, 11/00
U.S. Cl. 71—34    3 Claims

ABSTRACT OF THE DISCLOSURE

A process for the production of ammonium phosphate fertilizer of low citrate insoluble $P_2O_5$ content from phosphate rock having a high magnesium content by the reaction of ammonia with magnesium-containing phosphoric acid produced from said phosphate rock, in which slurry produced by the said reaction is passed to a granulating step under non-quiescent conditions and mixed with ammonium phosphate fines for substantially immediate absorption of moisture from said slurry by said fines and the time of reaction and granulation is limited to less than thirty minutes, to restrict crystal growth of citrate insoluble crystals in the slurry mixture. The amount of water in the slurry during ammoniation is adapted to control the exothermic heat of reaction within the temperature range of about 100° C. to about 150° C., and the amount of ammonium phosphate product fines recycled is sufficient to quickly reduce the water content in the slurry to about 2% to 4%.

---

This invention relates to a method and apparatus for producing ammonium phosphate fertilizer and is particularly directed to a method and apparatus for producing ammonium phosphate fertilizer having a low citrate insoluble $P_2O_5$ content from phosphoric acids having high magnesium contents.

Wet process phosphoric acid contains certain impurities, including compounds of such elements as iron, aluminum and magnesium, which were originally present in the source phosphate rock. During ammoniation of the acid to manufacture fertilizers, precipitation takes place of the fertilizer compounds in the form of mono- and di-ammonium phosphates, and also of some of the impurities in the form of complex phosphate compounds of a crystalline nature. The $P_2O_5$ content of that portion of these compounds which is insoluble in neutral ammonium citrate solutions, as determined by the method of the Association of Official Agricultural Chemists, is known as citrate insoluble $P_2O_5$ (C.I./$P_2O_5$). The C.I./$P_2O_5$ content of ammonium phosphate fertilizer cannot be included in the available $P_2O_5$ content as specified for sales purposes and thus constitutes a loss to the manufacturer.

In conventional processes for the manufacture of ammonium phosphates, phosphoric acid is produced from phosphate rock by acidulation of the rock with sulphuric acid followed by filtration to remove solids and the acid thus obtained is concentrated by evaporation to the desired $P_2O_5$ level. This acid is fed from a feed tank into the top of one of a series of large agitators wherein ammoniation is effected by injecting gaseous or liquid ammonia near the bottom of one or more agitators well below the surface of the resulting slurry. Sulphuric acid, used for grade adjustment, is added as necessary from a separate feed line. The slurry is thoroughly mixed to insure a homogeneous product; the retention time of the slurry in the ammoniation system is approximately 5 hours, dependent on the rate of throughput and size of agitators employed. The ammoniation reaction is carried out to give, for example, an 11–48–0 grade fertilizer product, the degree of ammoniation in this case being adjusted to give a pH in the range of 3.8–4.6 in the slurry. The resulting slurry overflows from the ammoniation system through a launder to a product recovery system consisting of a blunger, drier, and product sizing equipment having facilities for return of reject fines and crushed oversize material to the blunger.

Conventional ammonium phosphate fertilizer production as described hereinabove can tolerate phosphoric acids having a content of about 0.3% Mg, expressed as MgO, which will give approximately 0.1 to 0.3% C.I./$P_2O_5$ content in the finished product. However, phosphoric acids having a content of 0.7% or higher Mg, expressed as MgO, result in fertilizer products which have much higher C.I./$P_2O_5$ contents, as high as 1.5%. The use, therefore, of phosphoric acids having high magnesium contents, such as are produced from phosphate rocks of high-magnesium content which are commonly found in certain regions of the Western United States, results in an undesirably high C.I./$P_2O_5$ content in the finished fertilizer products which imposes a severe penalty and disadvantage on the manufacturer.

I have discovered that high magnesium-containing phosphoric acids can be utilized in the continuous production of ammonium phosphate fertilizers containing 0.1% or less C.I./$P_2O_5$ by an improved process which may incorporate a rapid reaction method of the type described in Canadian Pat. No. 697,036, issued Nov. 3, 1964, when operated within certain critical operating ranges.

I have found that by obviating conditions amenable to crystal growth in the various steps of the overall process, such as high rates of crystallization, quiescent environment and prolonged retention times during the reacting, separating, transferring and mixing and granulating steps, the C.I./$P_2O_5$ content of the finished product can be maintained below 0.1% notwithstanding high concentrations of magnesium in the phosphoric acid.

One possible explanation of this improved result is that the compounds that could cause a high C.I./$P_2O_5$ content are precipitated as small crystals and under the foregoing conditions of operation of the process of the present invention, growth of these small crystals is halted shortly after nucleation and initial growth, and these relatively small crystals are more readily soluble than the larger crystals normally formed in conventional fertilizer operations.

Thus there is provided a process for the production of ammonium phosphate fertilizer of low C.I./$P_2O_5$ content from phosphate rock of high magnesium content by reacting ammonia with magnesium-containing wet process phosphoric acid produced from said rock, which comprises the steps of: separately feeding said ammonia and said phosphoric acid continuously into a reaction zone; reacting said ammonia and said phosphoric acid in said reaction zone to form an ammonium phosphate slurry; continuously discharging slurry and steam from said reaction zone; continuously separating steam from the slurry in a separation zone; passing said slurry to a granulating step under non-quiescent conditions; mixing and slurry with ammonium phosphate fines in said granulating step for substantially immediate absorption of moisture from said slurry by said fines and for granulating of the resultant mixture of slurry and fines, and controlling the time between initiation of the reaction in the reacting step and formation of the resultant mixture in granular form in the granulating step such that said time is not more than 30 minutes, whereby cessation of crystal growth and granulation of the mixture are effected; discharging from said granulating step granulated material formed from said resultant mixture to a drying step; and recovering ammonium phosphate fertilizer from said drying step.

It is a principal object, therefore, to provide a process for the production of ammonium phosphate fertilizers with a C.I./$P_2O_5$ content of 0.3% or less, typically 0.1% or less, from phosphoric acids with a high magnesium content and thus to permit utilization of phosphate rocks with a high magnesium content.

Another object of the invention is the provision of a simple process which is positive and substantially trouble-free in operation requiring a relatively low capital investment and having a high capacity for the production of ammonium phosphate fertilizers.

These and other objects of the invention, and the manner in which they can be attained, will become apparent from the following description of the process with reference to the drawing in which:

The drawing is a schematic illustration of the process of the invention incorporating therein a sectional view of an apparatus found suitable for the practice of the process.

Like reference characters refer to like parts throughout the description and drawing.

With reference to the drawing, the interaction of reactants for the production of fertilizer preferably is conducted in a vertical cylindrical reactor indicated generally by the numeral 8 which defines a reaction zone 9 extending from the inlet end 10 at the bottom of the reactor to the outlet end 11 at the top of the reactor. Reactor 8 preferably is formed of materials capable of resisting corrosion and erosion through attack by the reactants or by the reaction mixture. The reactor is of such volumetric proportion relative to throughput i.e. flow of reactants or reaction mixture through the reactor, that a short retention time of the reaction products is obtained. For example, I have found reactor vessels with their long axis disposed vertically measuring 5 feet high by 17 inches inside diameter in one installation and 9 feet high by 17 inches inside diameter in a second separate installation and constructed of brick and lead-lined steel, provide satisfactorily short retention times for the production of 200 to 300 tons per day of fertilizer.

Phosphoric acid or phosphoric and sulphuric acids are continuously introduced into the bottom of the reactor with gaseous or liquid ammonia for controlled reaction therein to selectively form mono- and di-ammonium phosphates of conventional 11-48-0 or 16-48-0 grade fertilizers or ammonium phosphate-sulphate fertilizer of, for example, 16-20-0 grade. It will be understood that the term "ammonium phosphate" used herein is intended to be generic to and to include the foregoing fertilizers. The rate of sulphuric acid introduction to the reactor relative to the rate of phosphoric acid and ammonia feed is controlled to provide the desired grade of ammonium phosphate fertilizer product. In the production of 16-20-0 grade, part or all of the sulphate content can be provided by ammonium sulphate solution.

The reaction is exothermic and, once initiated, maintains the reactor temperature within the range of from about 100° to about 150° C. without the application of external heat. The reactor temperature is mainly dependent on the water content of the reactants, and other added ingredients, if any.

For the production of 11-48-0 grade fertilizer product, the degree of ammoniation is adjusted to provide a pH in the range of about 3.8 to 4.6 in the slurry, the pH measurement in the slurry being determined by the use of bromcresol-green as indicator.

The reaction mixture in the form of a liquid-solid slurry flows from the top or outlet end 11 of the reactor vessel 8 directly to a separator 12 in which the liquid-solid slurry falls by gravity to the apex 14 of the separator and is discharged to a granulator, such as blunger 16 under non-quiescent conditions, by way of launder 18. Steam and other vapours are exhausted from separator 12 through upper outlet 20 and passed to a conventional absorber (not shown) for the separation and recovery of any valuable and/or atmosphere polluting constituents.

It may be desired to convey the slurry from separator 12 through a small vessel designated by numeral 22 wherein additional ingredients, such as ammonium sulphate, potassium salts or diluents, can be introduced to and mixed or reacted with the slurry. The slurry normally is discharged from the separator 12 directly to blunger 16, which has a plurality of rotating mixing paddles 24. A relatively large amount of recycled ammonium phosphate fines is fed at the inlet end of the blunger for admixture with the slurry passing thereto from separator 12. A ratio of recycle fines to slurry in the range of about 5:1 to about 12:1 by weight has proved satisfactory in the operation of the process. The paddles 24 knead the fines into the slurry, producing a homogeneous, granular material containing about 2 to 4% moisture.

The granules from the blunger are passed continuously to dryer 33 where the small amount of remaining moisture (usually from about 2% to about 4% by weight) is removed. The dried product is then conveyed to screening unit 26, from which ammonium phosphate granules within the desired size range are discharged as finished product. Oversize granules are crushed in crusher 28 and combined with undersize particles for recycle to the blunger as process fines.

The mixing of the reaction mixture with the fines in the mixing and granulating step results in the recycle fines absorbing the moisture from the slurry, quickly reducing the relative amount of liquid phase compared with solid phase in the mixture and thus inhibiting further growth of crystals of the C.I./$P_2O_5$ compounds in the resulting particles.

The total retention time throughout the several steps of the process beginning at the initiation of the ammoniation reaction in the reactor and extending through the granulating step, i.e., in the process as illustrated in the drawing, from reactor inlet to blunger outlet, is from about 1.5 to about 30 minutes, preferably from about 1.5 to about 16 minutes. This short overall retention period effectively prevents the formation of C.I./$P_2O_5$ compounds in the solid product.

If in the overall process or in any of the steps of the process, where there is sufficient moisture to sustain crystallization, the retention time is prolonged so that the overall retention time exceeds more than about 30 minutes, the C. I./$P_2O_5$ content may rise beyond normally acceptable values of up to about 0.5%.

The process according to the invention is illustrated in the following examples.

EXAMPLE I

A phosphoric acid, prepared from phosphate rock with a normal magnesium content according to known methods, which contained 0.5% Mg expressed as MgO, and having a specific gravity of 1.46-1.48 and a $P_2O_5$ content of 550 grams per liter, was ammoniated according to the conventional method as described above to a pH of about 4.3 to give an 11-48-0 fertilizer product. The slurry temperature was 105° C. The production rate was maintained at 240 tons per day. The average retention time from initiation of the ammoniation reaction to discharge from the blunger was about 5 hours. The finished product had a C.I./$P_2O_5$ content of 0.3%.

A typical chemical analysis of the phosphate rock, the acid, and the 11-48-0 fertilizer product produced according to the conventional process, is given in Table I.

TABLE I.—TYPICAL ANALYSIS*

|  | Normal Mg Content | | Conventional Process, 11-48-0 |
| --- | --- | --- | --- |
|  | Rock | Acid |  |
| T/N |  |  | 11.6 |
| T/$P_2O_5$ | 30.8 | 30.9 | 48.5 |
| C.I./$P_2O_5$ |  |  | 0.3 |
| $Al_2O_3$ | 1.6 | 1.3 | 1.9 |
| CaO | 42.8 | 0.2 | 1.4 |
| F | 3.3 | 1.9 | 3.0 |
| MgO | 0.2 | 0.2 | 0.3 |
| Fe | 0.9 | 0.8 | 1.1 |
| $SiO_2$ | 17.2 | 0.7 | 1.6 |
| Na | 0.3 | 0.1 | 0.1 |
| K | 0.2 | 0.1 | 0.1 |
| $CO_2$ | 1.0 |  |  |
| $SO_4$ |  | 1.5 | 8.5 |
| Ignition loss | 1.4 |  |  |

*Figures are given in percent.
NOTE.—T=Total.

EXAMPLE II

A phosphoric acid, prepared from phosphate rock with a high magnesium content according to the method of Example I, which contained 1.6% Mg, expressed as MgO, with a specific gravity of 1.52–1.56 and a $P_2O_5$ content of 550 grams per liter was ammoniated as in Example I according to the conventional method, while maintaining the same operating conditions.

The finished product had a total $P_2O_5$ content of 48.5% and a C.I./$P_2O_5$ content of 1.5%.

EXAMPLE III

Phosphoric acid of the same composition as that used in Example II was ammoniated using the process of the present invention. The retention time in the system from reactor inlet to blunger outlet, in accordance with the invention, was 3 minutes. The temperature of the slurry in the reaction vessel was 110° C. The production rate was the same as in Examples I and II, 240 tons per day.

The finished product had a C.I./$P_2O_5$ content of 0.1%.

The chemical analyses of the phosphate rock, the acid prepared therefrom, and the 11-48-0 fertilizer product produced according to the invention, are given in Table II.

TABLE II.—TYPICAL ANALYSIS*

|  | High Mg Content | | Invented Process, 11-48-0 |
| --- | --- | --- | --- |
|  | Rock | Acid |  |
| T/N |  |  | 11.1 |
| T/$P_2O_5$ | 29.2 | 30.6 | 48.5 |
| C.I./$P_2O_5$ |  |  | 0.1 |
| $Al_2O_3$ | 1.5 | 1.0 | 1.5 |
| CaO | 44.6 | 0.2 | 1.3 |
| F | 3.0 | 2.3 | 3.5 |
| MgO | 1.5 | 1.6 | 2.5 |
| Fe | 0.7 | 0.5 | 0.8 |
| $SiO_2$ | 11.6 | 0.8 | 1.2 |
| Na | 0.3 | 0.1 | 0.1 |
| K | 0.2 | 0.1 | 0.1 |
| $CO_2$ | 4.8 |  |  |
| $SO_4$ |  | 1.6 | 9.0 |
| Ignition loss | 1.7 |  |  |

*Figures are given in percent.
NOTE.—T=Total.

It will be noted from Example II that the required grade of 48% available $P_2O_5$ for the fertilizer product was not achieved although the total $P_2O_5$ content, 48.5%, is the same as that of the products of Examples I and III. In the case of the products of Examples I and III the C.I./$P_2O_5$ content is low enough that the available $P_2O_5$ figure is not below the required grade of 48%, and the products can be sold commercially as fertilizer of the standard 11-48-0 grade. On the other hand, the product of Example II cannot meet the requirements for available $P_2O_5$ and therefore cannot be sold as a fertilizer of standard 11-48-0 grade.

The present invention provides important advantages. Production of ammonium phosphate fertilizer with low C.I./$P_2O_5$ content, less than 0.5%, can be effected from phosphoric acid with a high magnesium content. For example, the process has been operated with phosphoric acid containing as much as 2.5% Mg, expressed as MgO, obtaining a fertilizer product having only 0.1% C.I./$P_2O_5$.

Because of the present invention it is now feasible to use as raw material deposits of phosphate rock high in magnesium which would not otherwise be economically suitable for use in fertilizer production.

What I claim as new and desire to protect by Letters Patent of the United States is:

1. A method of treating wet process phosphoric acid having a magnesium content of greater than about 0.2%, expressed as MgO, the phosphoric acid having been prepared by acidulation with sulphuric acid of phosphate rock having a high magnesium content, said method comprising the steps of:

(a) separately and continuously feeding ammonia and said phosphoric acid into a reaction zone of volumetric proportion relative to throughput adapted to produce the reaction products in a short retention time, (b) reacting the ammonia and phosphoric acid in the reaction zone at a pH value effective to ammoniate phosphoric acid to form steam and a slurry of an ammonium phosphate that is citrate soluble and the water content of slurry being in an amount adapted to control the exothermic heat of reaction to maintain a temperature within the range of from about 100° C. to about 150° C., (c) continuously discharging the slurry and steam from the reaction zone into a separation zone and continuously separating steam from the slurry in the separation zone, (d) continuously passing said slurry under nonquiescent conditions to a granulating step, (e) mixing and granulating said slurry with recycled dry ammonium phosphate fines in a ratio of recycled phosphate fines to slurry in a range from about 5:1 to about 12:1 by weight in amounts sufficient to quickly reduce the moisture content of the slurry mixture to about 2% to 4% to produce a homogeneous granulated ammonium phosphate material, (f) discharging granulated material from said granulating step to a drying step and recovering ammonium phosphate fertilizer from said drying step, and (g) controlling the total retention time between initiation of the reaction in the reacting step and the formation of the homogeneous granulated fertilizer material in the granulating step such that said total retention time is not more than 30 minutes, whereby cessation of crystal growth and granulation of the mixture are effected and the citrate insoluble $P_2O_5$ content of the ammonium phosphate fertilizer recovered from said drying step is less than 0.5% by weight.

2. A method as defined in claim 1 wherein the total retention time is between about 1.5 and 30 minutes.

3. A method as defined in claim 1 wherein the total retention time is between about 1.5 and 16 minutes.

References Cited

UNITED STATES PATENTS 1,881,195   10/1932   Kaselitz _____ 71—43 XR
2,739,054    3/1956   Andres et al. _____ 71—43 XR (Other references on following page)

UNITED STATES PATENTS

| | | | |
|---|---|---|---|
| 3,141,732 | 7/1964 | McCullough et al. | 71—43 XR |
| 3,171,733 | 3/1965 | Hignett et al. | 71—43 XR |
| 3,243,279 | 3/1966 | Young | 71—43 |
| 3,313,614 | 4/1967 | Sharples et al. | 71—43 XR |
| 3,323,863 | 6/1967 | Seymour | 71—43 XR |
| 3,005,696 | 10/1961 | Hignett et al. | 71—43 XR |
| 3,153,574 | 10/1964 | Achorn et al. | 71—43 XR |
| 3,416,910 | 12/1968 | Legal et al. | 71—43 XR |
| 3,419,378 | 12/1968 | Kearns | 71—34 |

FOREIGN PATENTS

| | | |
|---|---|---|
| 697,036 | 11/1964 | Canada. |

OTHER REFERENCES

Hackh's Chemical Dictionary, 3rd edition, 1944, pp. 505–506, McGraw-Hill Book Co., New York.

REUBEN FRIEDMAN, Primary Examiner

B. H. LEVENSON, Assistant Examiner

U.S. Cl. X.R.

71—36, 43, 50, 64